US006001159A

United States Patent [19]

Furuya et al.

[11] Patent Number: 6,001,159

[45] Date of Patent: Dec. 14, 1999

[54] REVERSIBLE THERMOSENSITIVE COLORING COMPOSITION AND REVERSIBLE THERMOSENSITIVE RECORDING MEDIUM USING THE SAME

[75] Inventors: Hiromi Furuya, Shizuoka-ken; Masafumi Torii, Shizuoka; Kyoji Tsutsui, Mishima; Masaru Shimada, Shizuoka-ken, all of Japan

[73] Assignee: Ricoh Company, Ltd., Tokyo, Japan

[21] Appl. No.: 09/114,527

[22] Filed: Jul. 13, 1998

Related U.S. Application Data

[62] Division of application No. 08/705,259, Aug. 29, 1996, Pat. No. 5,866,505.

[30] Foreign Application Priority Data

| | | | |
|---|---|---|---|
| Aug. 31, 1995 | [JP] | Japan | 7-245165 |
| Aug. 31, 1995 | [JP] | Japan | 7-245182 |
| Aug. 20, 1996 | [JP] | Japan | 8-235791 |

[51] Int. Cl.$^{6}$ ..................... C09D 11/00

[52] U.S. Cl. ..................... 106/31.17; 106/31.18; 106/31.23

[58] Field of Search ..................... 106/31.14, 31.16, 106/31.17, 31.18, 31.23; 427/150, 151; 503/201, 216, 217, 225

[56] References Cited

U.S. PATENT DOCUMENTS

| | | | |
|---|---|---|---|
| 4,880,768 | 11/1989 | Mochizuki et al. | 503/227 |
| 5,019,550 | 5/1991 | Suzuki et al. | 503/227 |
| 5,049,538 | 9/1991 | Mochizuki et al. | 503/227 |
| 5,143,893 | 9/1992 | Mochizuki et al. | 503/227 |
| 5,144,334 | 9/1992 | Suzuki et al. | 346/1.1 |
| 5,185,194 | 2/1993 | Miyake et al. | 428/64 |
| 5,306,687 | 4/1994 | Furuya et al. | 503/207 |
| 5,380,693 | 1/1995 | Goto | 503/200 |
| 5,395,815 | 3/1995 | Ikeda et al. | 503/216 |
| 5,403,810 | 4/1995 | Sawamura et al. | 503/201 |
| 5,447,900 | 9/1995 | Suzaki et al. | 503/207 |
| 5,472,931 | 12/1995 | Morohoshi et al. | 503/227 |
| 5,482,912 | 1/1996 | Furuya et al. | 503/207 |
| 5,489,501 | 2/1996 | Torii et al. | 430/341 |
| 5,498,775 | 3/1996 | Maruyama et al. | 503/216 |
| 5,521,138 | 5/1996 | Shimada et al. | 503/209 |
| 5,532,201 | 7/1996 | Goto | 503/213 |
| 5,547,500 | 8/1996 | Tsutsui | 106/21 A |
| 5,622,909 | 4/1997 | Furuya et al. | 503/216 |

*Primary Examiner*—Bruce Hess
*Attorney, Agent, or Firm*—Oblon, Spivak, McClelland, Maier & Neustadt, P.C.

[57] ABSTRACT

A reversible thermosensitive coloring composition contains an electron-donating coloring compound and an electron-accepting compound, and is capable of reversibly assuming a color-developed state or a decolorized state depending upon the the temperature of the reversible thermosensitive coloring composition when heated, and/or the cooling rate of the reversible thermosensitive coloring composition when cooled after the heating thereof, with the electron-accepting compound being a compound of formula (I):

$$A—R—X \qquad (I)$$

wherein A represents a color-developing moiety; R represents an aliphatic hydrocarbon group comprising as the main chain thereof a straight chain hydrocarbon group having 8 or more carbon atoms, and may comprise a bivalent hetero-atom containing group and/or a bivalent aromatic group; and X represents a hetero-atom containing associative group. There is also provided a reversible thermosensitive recording medium comprising a support, and a thermosensitive recording layer formed thereon comprising the aforementioned reversible thermosensitive coloring composition.

2 Claims, 3 Drawing Sheets

REVERSIBLE THERMOSENSITIVE COLORING COMPOSITION AND REVERSIBLE THERMOSENSITIVE RECORDING MEDIUM USING THE SAME

This application is a Div of 08/705,259 filed Aug. 29, 1996 now U.S. Pat. No. 5,866,505.

BACKGROUND OF THE INVENTION

1. Field of the Invention

The present invention relates to a reversible thermosensitive coloring composition comprising an electron-donating coloring compound and an electron-accepting compound, capable of inducing color formation by utilizing the coloring reaction between the electron-donating compound and the electron-accepting compound. The present invention also relates to a reversible thermosensitive recording medium using the above-mentioned reversible thermosensitive coloring composition, which recording medium is capable of repeatedly forming a colored image therein and erasing the same therefrom by controlling the thermal energy applied thereto.

2. Discussion of Background

There is conventionally known a thermosensitive recording medium utilizing the coloring reaction between an electron-donating compound (hereinafter referred to as a coloring agent) and an electron-accepting compound (hereinafter referred to as a color developer). This kind of thermosensitive recording medium is widely used, for example, for a facsimile apparatus, a word processor, and a printer of a scientific measuring instrument. However, the coloring reaction of the conventional thermosensitive recording medium of this type has no reversibility, so that color development and decolorization cannot be alternately repeated.

Among published patents, there are several proposals for a thermosensitive recording medium which can reversibly carry out the color development and decolorization utilizing a coloring reaction between a coloring agent and a color developer. For example, a thermosensitive recording medium using phloroglucinol and gallic acid as color developers in combination is disclosed in Japanese Laid-Open Patent Application 60-193691. There is disclosed in Japanese Laid-Open Patent Application 61-237684 a reversible thermosensitive recording medium which employs compounds such as phenolphthalein and thymolphthalein as color developers. In Japanese Laid-Open Patent Applications 62-138556, 62-138568 and 62-140881, there are disclosed reversible thermosensitive recording media, each comprising a recording layer which contains a homogeneously dissolved composition of a coloring agent, a color developer and a carboxylic acid ester. Further, in Japanese Laid-Open Patent Application 63-173684, a reversible thermo-sensitive recording medium comprising as a color developer an ascorbic acid derivative is disclosed. In addition, a reversible thermosensitive recording medium comprising as a color developer a salt of bis(hydroxyphenyl) acetic acid or gallic acid, and a higher aliphatic amine is disclosed in Japanese Laid-Open Patent Applications 2-188293 and 2-188294.

In the above-mentioned conventional reversible thermosensitive recording media, however, both of the stability of a colored image and the facility for decolorization are not always satisfied at the same time, and there is the problem with respect to the density of a colored image, and the stability of the repeated coloring and decolorization operations. Therefore, the conventional reversible recording media are not satisfactory for practical use.

The inventors of the present invention have previously proposed a reversible thermosensitive coloring composition which comprises an organic phosphoric acid compound, an aliphatic carboxylic acid compound or a phenol compound, each having a long-chain aliphatic hydrocarbon group therein, as a color developer, and a leuco dye as a coloring agent, as disclosed in Japanese Laid-Open Patent Application 5-124360. By use of such a reversible thermosensitive coloring composition, the color development and the decolorization can be easily carried out by controlling the heating and cooling conditions for the coloring composition, and further, the color-developed state and the decolorized state can be stably maintained at room temperature, and the color development and the decolorization can be alternately repeated in a stable condition. In this application, there is also proposed a reversible thermosensitive recording medium which comprises a recording layer containing the above-mentioned reversible thermosensitive coloring composition. Although this kind of reversible thermosensitive recording medium attains a satisfactory level for practical use with respect to the compatibility of the stability of a colored image with the facility for decolorization, and the density of a colored image, there is yet room for improvement in the problem of preservation stability.

The use of a phenol compound with a specific structure having a long-chain aliphatic hydrocarbon group as the color developer is proposed in Japanese Laid-Open Patent Application 6-210954. However, a reversible thermosensitive recording medium comprising the above-mentioned phenol compound as the color developer has the same drawbacks as mentioned above.

SUMMARY OF THE INVENTION

It is therefore a first object of the present invention to provide a reversible thermosensitive coloring composition with excellent preservation stability.

A second object of the present invention is to provide a reversible thermosensitive recording medium capable of exhibiting excellent preservation stability.

The first object of the present invention can be achieved by a reversible thermosensitive coloring composition comprising an electron-donating coloring compound and an electron-accepting compound which is capable of inducing color formation in the electron-donating coloring compound, capable of reversibly assuming a color-developed state or a decolorized state, depending upon the the temperature of the reversible thermosensitive coloring composition when heated, and/or the cooling rate of the reversible thermosensitive coloring composition when cooled after the heating thereof, wherein the electron-accepting compound is a compound of formula (I):

$$A\text{—}R\text{—}X \qquad (I)$$

wherein A represents a color-developing moiety capable of inducing color formation in the electron-donating coloring compound; R represents an aliphatic hydrocarbon group comprising as the main chain thereof a straight chain hydrocarbon group having 8 or more carbon atoms, and may comprise a bivalent hetero-atom containing group and/or a bivalent aromatic group; and X represents a hetero-atom containing associative group.

In the above-mentioned reversible thermosensitive coloring composition, the color-developing moiety of A in formula (I) may be a moiety represented by formula (II):

(II)

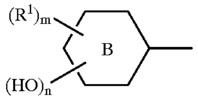

wherein B is an aromatic ring such as benzene ring or naphthalene ring, or a heterocyclic ring; $R^1$ is an alkyl group having 1 to 6 carbon atoms, an alkoxyl group having 1 to 6 carbon atoms, or a halogen atom; n is an integer of 1 to 3; and m is an integer of 0 to 3.

The second object of the present invention can be achieved by a reversible thermosensitive recording medium comprising a support, and a thermosensitive recording layer formed thereon comprising the above-mentioned reversible thermosensitive coloring composition.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
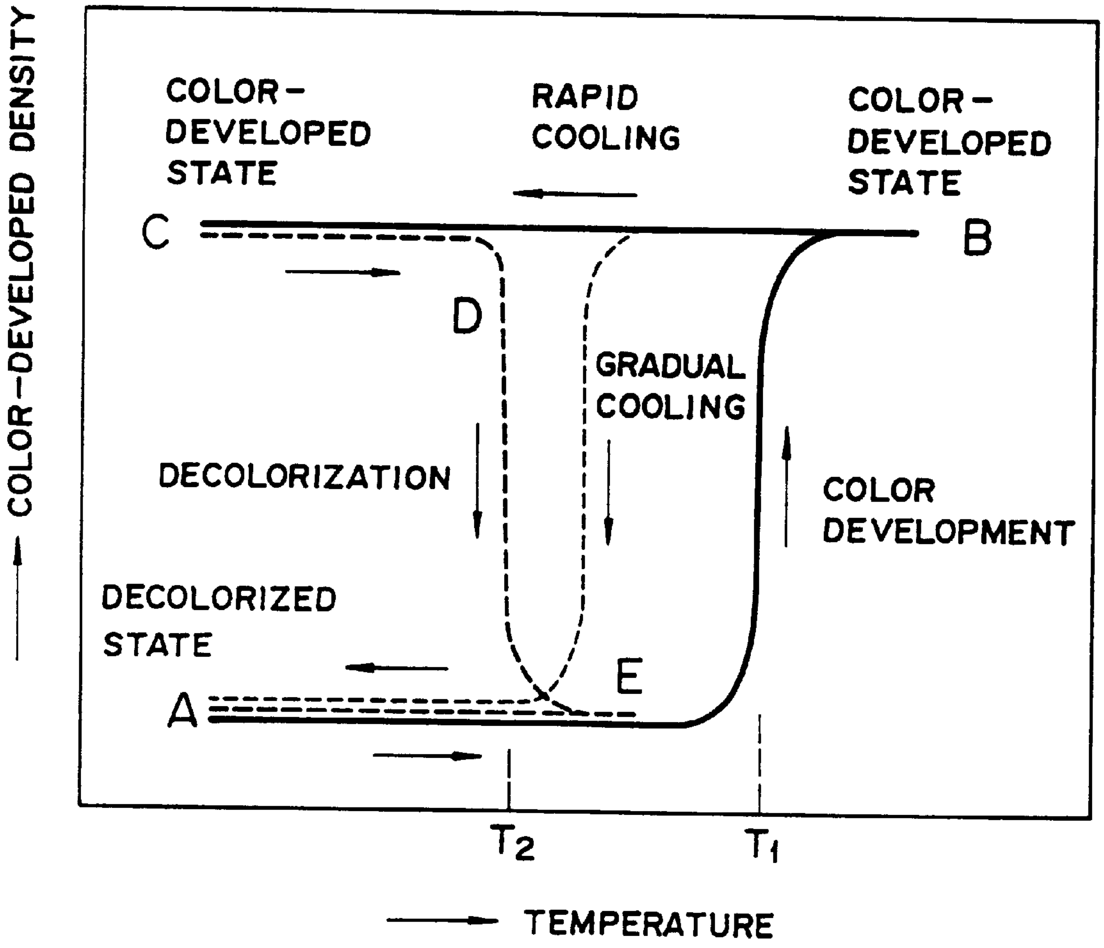
FIG. 1 is a diagram showing the color development and decolorization properties of a reversible thermosensitive coloring composition of the present invention depending on the temperature thereof.

The inventors of the present invention believed that the capability of a color developer having a long-chain aliphatic hydrocarbon group to induce color formation in a coloring agent and the balance of cohesive force between molecules of the color developer become key features in the reversible color development and decolorization phenomenon of a composition comprising the above-mentioned color developer and coloring agent. Many kinds of color developer compounds with various structures have been studied based on the above belief, and finally, it is found that the shortcomings of the conventional reversible thermosensitive coloring compositions can be eliminated by using a color developer which has a long-chain hydrocarbon group containing an associative group at the terminal position thereof.

In a reversible thermosensitive coloring composition according to the present invention which comprises an electron-donating coloring compound and an electron-accepting compound capable of inducing color formation in the electron-donating coloring compound, a compound of formula (I) is used as the electron-accepting compound:

$$A—R—X \qquad (I)$$

wherein A represents a color-developing moiety capable of inducing color formation in the electron-donating coloring compound; R represents an aliphatic hydrocarbon group comprising as the main chain thereof a straight chain hydrocarbon group having 8 or more carbon atoms, and may comprise a bivalent hetero-atom containing group and/or a bivalent aromatic group; and X represents a hetero-atom containing associative group.

Preferable examples of the color-developing moiety represented by A in formula (I) are as follows:

(II)

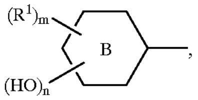

(III)

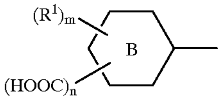

and (IV)

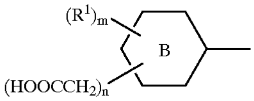

wherein B is an aromatic ring such as benzene ring or naphthalene ring, or a heterocyclic ring; $R^1$ is an alkyl group having 1 to 6 carbon atoms, an alkoxyl group having 1 to 6 carbon atoms, or a halogen atom; n is an integer of 1 to 3; and m is an integer of 0 to 3.

As previously mentioned, R in formula (I) is an aliphatic hydrocarbon group comprising as the main chain thereof a straight chain hydrocarbon group having 8 or more carbon atoms, and may comprise a bivalent aromatic group. The aliphatic hydrocarbon group may comprise a branched hydrocarbon group which may have a substituent such as hydroxyl group, a halogen atom or an alkoxyl group, or include unsaturated bond.

To prevent the deterioration of the color development stability and the decolorization characteristics of the coloring composition, it is preferable that the straight chain hydrocarbon group serving as the main chain of the aliphatic hydrocarbon group represented by R in formula (I) have 8 or more carbon atoms, more preferably 11 or more carbon atoms. Even if the number of carbon atoms for use in the straight chain hydrocarbon group serving as the main chain of the aliphatic hydrocarbon group is 7 or less, the obtained electron-accepting compound can be employed for a non-reversible thermosensitive recording medium with respect to the color development and decolorization.

Preferable examples of the aliphatic hydrocarbon group represented by R in formula (I) are as follows:

$—(CH_2)_q—,$ $—(CH_2)_q—CH{=}CH—(CH_2)_{q'}—,$

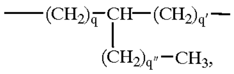

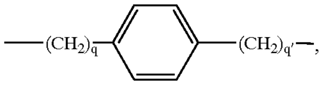

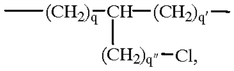

-continued

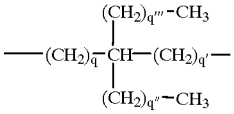

and

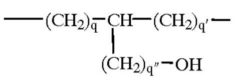

wherein q, q', q'' and q''' each is an integer, and $q+q' \geqq 8$.

Furthermore, R in formula (I) may comprise a bivalent hetero-atom containing group. In this case, R is represented by the following formulae:

R: $—Y—R^2—$ (V) and

R: $—R^3—Y—R^2—$ (VI)

wherein $R^2$ and $R^3$ each is the same bivalent aliphatic hydrocarbon group as defined in R; and Y is a bivalent hetero-atom containing group.

It is preferable that the above-mentioned bivalent hetero-atom containing group represented by Y in formulae (V) and (VI) comprise at least one group selected from group consisting of:

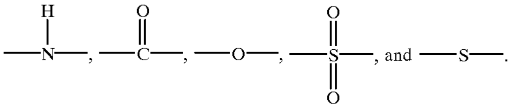

Specific examples of the preferable bivalent hetero-atom containing group are as follows:

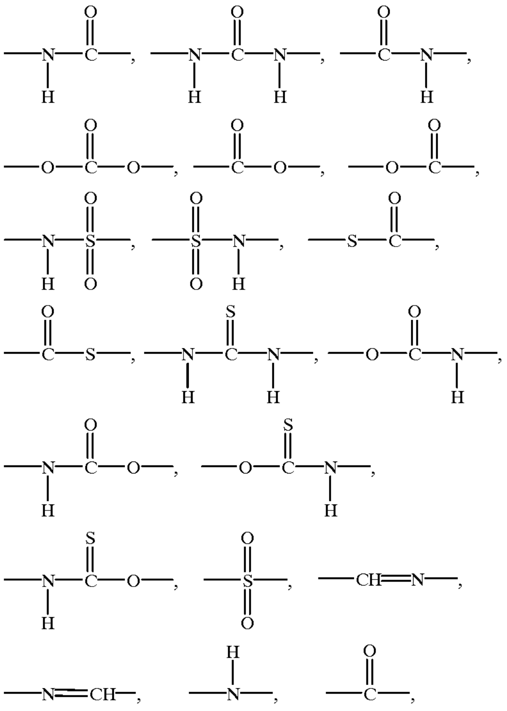

-continued

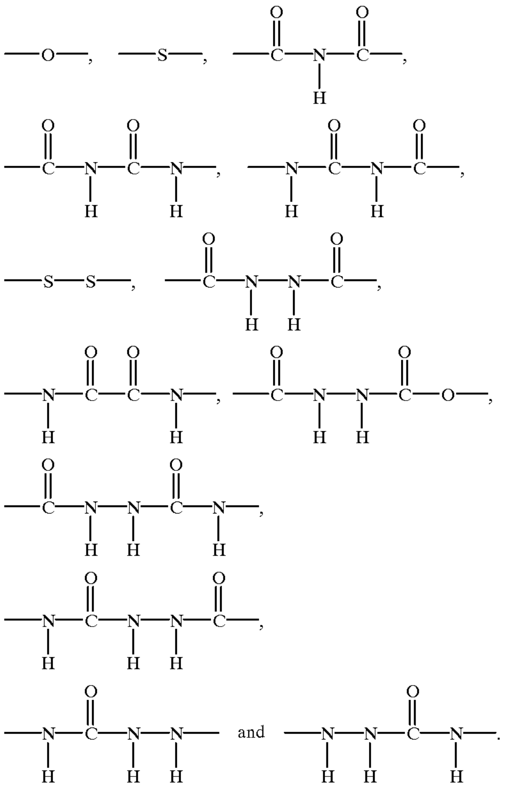

Further, Y in formulae (V) and (VI) may be a bivalent group containing one or more hetero-atom containing groups mentioned above via a hydrocarbon group such as an alkylene group, namely, as represented by the following formula (VII):

Y: $—Y^1—(R^4—Z)_l—$ (VII)

wherein $R^4$ is the same bivalent aliphatic hydrocarbon group as mentioned in R; $Y^1$ and Z each is the same bivalent hetero-atom containing group as mentioned in Y; and l is an integer of 1 to 4, and when l is 2 or more, each Z or each $R^4$ may independently be the same or different, and the total sum of carbon atoms included in the main chain is 8 or more.

As previously mentioned, X in formula (I) represents a hetero-atom containing associative group. The associative group is a group having hydrogen bonding, or molecular interaction such as electrostatic interaction, dipole interaction and induced dipole interaction. To be more specific, X represents a group containing at least one group selected from the following hetero-atom containing groups:

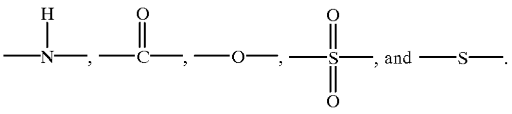

Specific examples of the hetero-atom containing associative group represented by X in formula (I) are as follows:

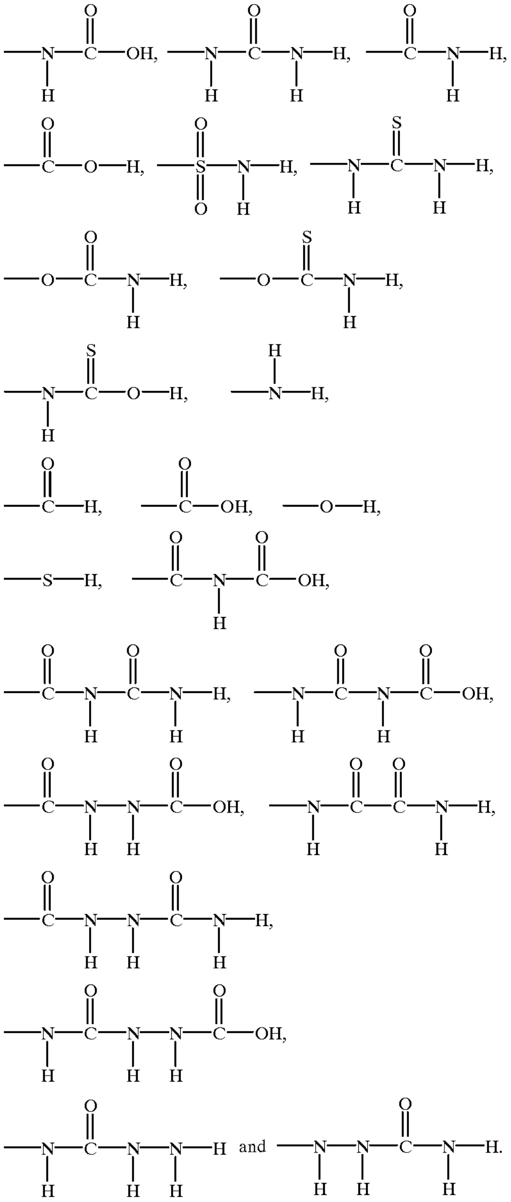

Preferable examples of the electron-accepting compound (color developer) represented by formula (I) are as follows:

(1)

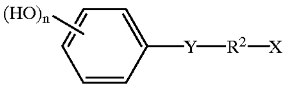

(2)

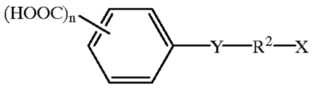

(3)

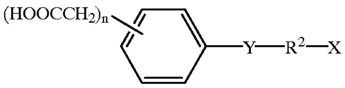

-continued (4)

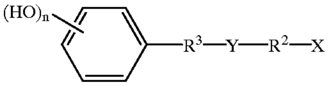

(5)

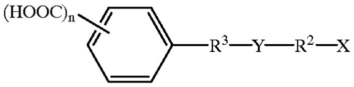

(6)

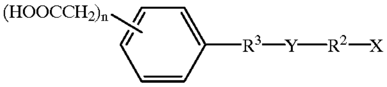

wherein $R^2$, $R^3$, X, Y and n are the same as those previously defined.

For instance, in the structure of the above-mentioned compound (1), a moiety of —Y— may be replaced by a moiety of —$Y^1$— ($R^4$—Z)$_l$—, as represented by the following formula (7):

(7)

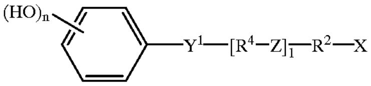

wherein $R^2$, $R^4$, X, Y, Z, n and l are the same as those previously defined.

Similarly, in the structure of each of the compounds of formulae (2) to (6), a moiety of —Y— may be replaced by a moiety of —$Y^1$— ($R^4$—Z)$_l$— as shown in formula (7).

Taking the case of the compound of formula (1), the following compounds can be employed as the preferable examples of the color developer:

(1-1)

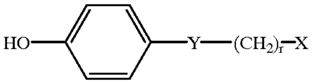

(1-2)

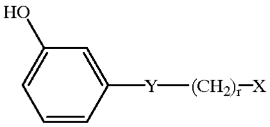

(1-3)

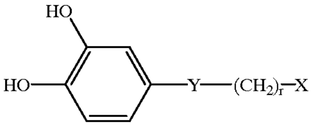

(1-4)

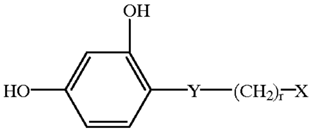

wherein r is an integer of 8 or more.

Similarly, each of the above-mentioned structures (1-1) to (1-4) can be applied to the compounds of formulae (2) to (6).

Specific examples of the color developer for use in the present invention having the structure as shown in formula (1-1) are shown in Table 1:
TABLE 1
(1-1-a)
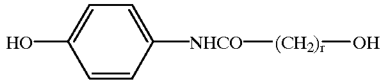
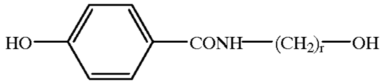
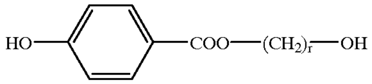
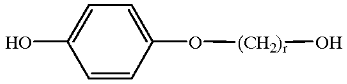
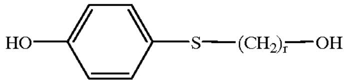
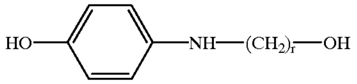
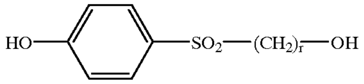
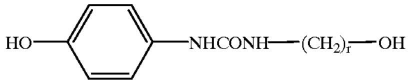
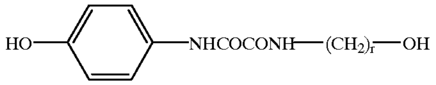
TABLE 1-continued
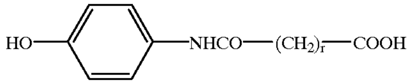
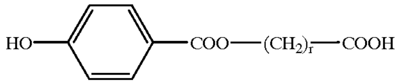
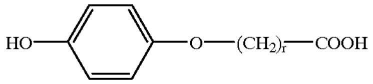
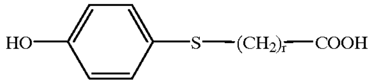
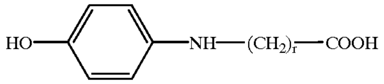
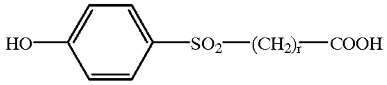
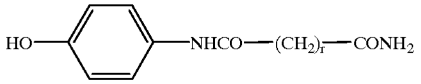

TABLE 1-continued
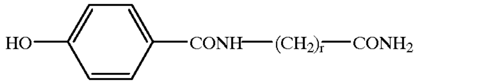
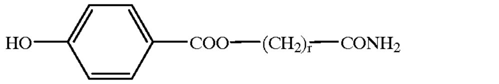
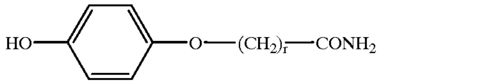
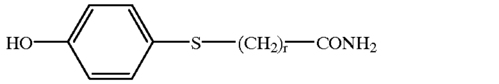
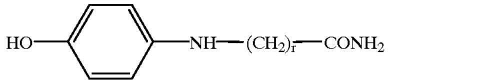
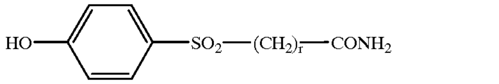
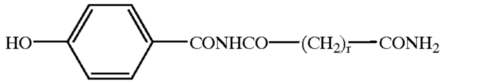
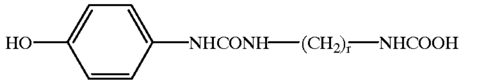
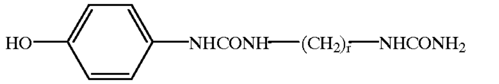
TABLE 1-continued
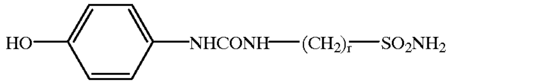
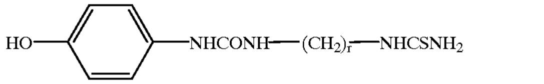
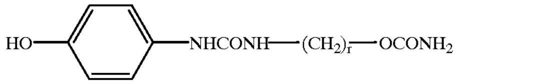
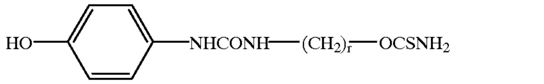
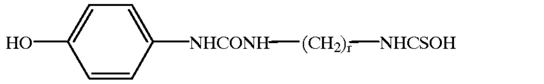
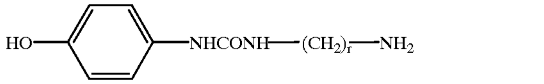
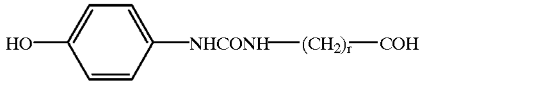
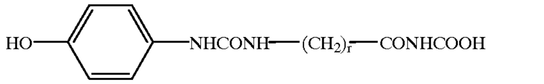
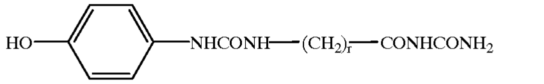
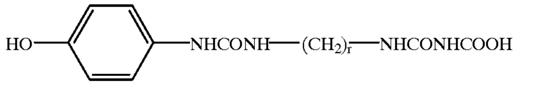
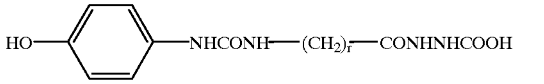
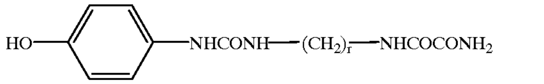
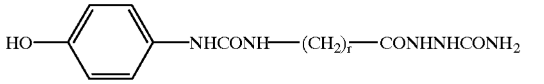
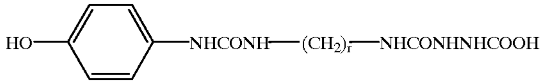

TABLE 1-continued

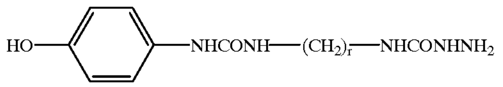

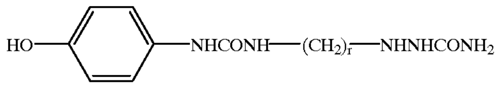

Furthermore, for example, in the structure of the compound of formula (1-1-a) in Table 1, it is preferable that r be an integer of 8 or more, preferably 11 or more, and further preferably in the range of 11 to 22 in view of the manufacturing conditions.

The reversible thermosensitive coloring composition of the present invention comprises as the main components the previously mentioned color developer and a coloring agent. The coloring agent for use in the present invention which has electron-donating characteristics is a colorless or light-colored dye precursor and is not limited to a particular coloring agent. Conventional leuco dyes such as triphenylmethane phthalide compounds, fluoran compounds, phenothiazine compounds, Leuco-Auramine compounds and indolinophthalide compounds can be employed as the coloring agents.

The following compounds of formula (VIII) and (IX) are preferably employed as the coloring agents in the present invention:

(VIII)

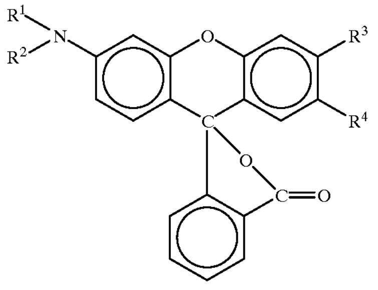

(IX)

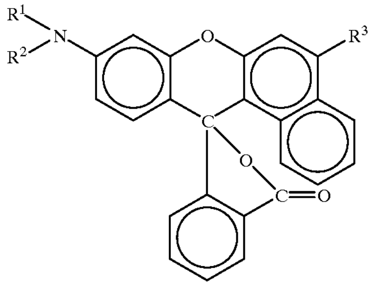

wherein $R^1$ is a hydrogen atom or an alkyl group having 1 to 4 carbon atoms; $R^2$ is an alkyl group having 1 to 6 carbon atoms, a cycloalkyl group, or a phenyl group which may have a substituent selected from the group consisting of an alkyl group such as methyl group or ethyl group, an alkoxyl group such as methoxy group or ethoxy group, and a halogen atom; $R^3$ is a hydrogen atom, an alkyl group having 1 or 2 carbon atoms, an alkoxyl group having 1 or 2 carbon atoms, or a halogen atom; and $R^4$ is a hydrogen atom, methyl group, a halogen atom, or an amino group which may have a substituent selected from the group consisting of an alkyl group, a substituted or unsubstituted aryl group, and a substituted or unsubstituted aralkyl group. As the substituent of the aryl group and aralkyl group, an alkyl group, a halogen atom or an alkoxyl group may be employed.

For instance, the following coloring agents can be employed in the present invention:

2-anilino-3-methyl-6-diethylaminofluoran,
2-anilino-3-methyl-6-di(n-butylamino)fluoran,
2-anilino-3-methyl-6-(N-n-propyl-N-methylamino)fluoran,
2-anilino-3-methyl-6-(N-isopropyl-N-methylamino)fluoran,
2-anilino-3-methyl-6-(N-isobutyl-N-methylamino)fluoran,
2-anilino-3-methyl-6-(N-n-amyl-N-methylamino)fluoran,
2-anilino-3-methyl-6-(N-sec-butyl-N-ethylamino)fluoran,
2-anilino-3-methyl-6-(N-n-amyl-N-ethylamino)fluoran,
2-anilino-3-methyl-6-(N-isoamyl-N-ethylamino)fluoran,
2-anilino-3-methyl-6-(N-n-propyl-N-isopropylamino)-fluoran,
2-anilino-3-methyl-6-(N-cyclohexyl-N-methylamino) fluoran,
2-anilino-3-methyl-6-(N-ethyl-p-toluidino)fluoran,
2-anilino-3-methyl-6-(N-methyl-p-toluidino)fluoran,
2-(m-trichloromethylanilino)-3-methyl-6-diethylamino-fluoran,
2-(m-trifluoromethylanilino)-3-methyl-6-diethylamino-fluoran,
2-(m-trichloromethylanilino)-3-methyl-6-(N-cyclohexyl-N-methylamino)fluoran,
2-(2,4-dimethylanilino)-3-methyl-6-diethylaminofluoran,
2-(N-ethyl-p-toluidino)-3-methyl-6-(N-ethylanilino)-fluoran,
2-(N-ethyl-p-toluidino)-3-methyl-6-(N-propyl-p-toluidino) fluoran,
2-anilino-6-(N-n-hexyl-N-ethylamino)fluoran,
2-(o-chloroanilino)-6-diethylaminofluoran,
2-(o-chloroanilino)-6-dibutylaminofluoran,
2-(m-trifluoromethylanilino)-6-diethylaminofluoran,
2-(p-acetylanilino)-6-(N-n-amyl-N-n-butylamino)fluoran,
2-benzylamino-6-(N-ethyl-p-toluidino)fluoran,
2-benzylamino-6-(N-methyl-2,4-dimethylanilino)fluoran,
2-benzylamino-6-(N-ethyl-2,4-dimethylanilino)fluoran,
2-dibenzylamino-6-(N-methyl-p-toluidino)fluoran,
2-dibenzylamino-6-(N-ethyl-p-toluidino)fluoran,
2-(di-p-methylbenzylamino)-6-(N-ethyl-p-toluidino)-fluoran,
2-(α-phenylethylamino)-6-(N-ethyl-p-toluidino)fluoran,
2-methylamino-6-(N-methylanilino)fluoran,
2-methylamino-6-(N-ethylanilino)fluoran,
2-methylamino-6-(N-propylanilino)fluoran,
2-ethylamino-6-(N-methyl-p-toluidino)fluoran,
2-methylamino-6-(N-methyl-2,4-dimethylanilino)fluoran,
2-ethylamino-6-(N-ethyl-2,4-dimethylanilino)fluoran,
2-dimethylamino-6-(N-methylanilino)fluoran,
2-dimethylamino-6-(N-ethylanilino)fluoran,
2-diethylamino-6-(N-methyl-p-toluidino)fluoran,
2-diethylamino-6-(N-ethyl-p-toluidino)fluoran,
2-dipropylamino-6-(N-methylanilino)fluoran,
2-dipropylamino-6-(N-ethylanilino)fluoran,
2-amino-6-(N-methylanilino)fluoran,
2-amino-6-(N-ethylanilino)fluoran,
2-amino-6-(N-propylanilino)fluoran,
2-amino-6-(N-methyl-p-toluidino)fluoran,
2-amino-6-(N-ethyl-p-toluidino)fluoran,
2-amino-6-(N-propyl-p-toluidino)fluoran,
2-amino-6-(N-methyl-p-ethylanilino)fluoran,
2-amino-6-(N-ethyl-p-ethylanilino)fluoran,
2-amino-6-(N-propyl-p-ethylanilino)fluoran, 2-amino-6-(N-methyl-2,4-dimethylanilino)fluoran,
2-amino-6-(N-ethyl-2,4-dimethylanilino)fluoran,
2-amino-6-(N-propyl-2,4-dimethylanilino)fluoran,
2-amino-6-(N-methyl-p-chloroanilino)fluoran,
2-amino-6-(N-ethyl-p-chloroanilino)fluoran,
2-amino-6-(N-propyl-p-chloroanilino)fluoran,
2,3-dimethyl-6-dimethylaminofluoran,
3-methyl-6-(N-ethyl-p-toluidino)fluoran,
2-chloro-6-diethylaminofluoran,
2-bromo-6-diethylaminofluoran,
2-chloro-6-dipropylaminofluoran,
3-chloro-6-cyclohexylaminofluoran,
3-bromo-6-cyclohexylaminofluoran,
2-chloro-6-(N-ethyl-N-isoamylamino)fluoran,
2-chloro-3-methyl-6-diethylaminofluoran,
2-anilino-3-chloro-6-diethylaminofluoran,
2-(o-chloroanilino)-3-chloro-6-cyclohexylaminofluoran,
2-(m-trifluoromethylanilino)-3-chloro-6-diethylaminofluoran,
2-(2,3-dichloroanilino)-3-chloro-6-diethylaminofluoran,
1,2-benzo-6-diethylaminofluoran,
1,2-benzo-6-(N-ethyl-N-isoamylamino)fluoran,
1,2-benzo-6-dibutylaminofluoran,
1,2-benzo-6-(N-methyl-N-cyclohexylamino)fluoran, and
1,2-benzo-6-(N-ethyl-N-toluidino)fluoran.

The following coloring agents can also be preferably employed in the present invention:

2-anilino-3-methyl-6-(N-2-ethoxypropyl-N-ethylamino)-fluoran,
2-(p-chloroanilino)-6-(N-n-octylamino)fluoran,
2-(p-chloroanilino)-6-(N-n-palmitylamino)fluoran,
2-(p-chloroanilino)-6-(di-n-octylamino)fluoran,
2-benzoylamino-6-(N-ethyl-p-toluidino)fluoran,
2-(o-methoxybenzoylamino)-6-(N-methyl-p-toluidino)-fluoran,
2-dibenzylamino-4-methyl-6-diethylaminofluoran,
2-dibenzylamino-4-methoxy-6-(N-methyl-p-toluidino)-fluoran,
2-benzylamino-4-methyl-6-(N-ethyl-p-toluidino)fluoran,
2-(α-phenylethylamino)-4-methyl-6-diethylaminofluoran,
2-(p-toluidino)-3-(t-butyl)-6-(N-methyl-p-toluidino)-fluoran,
2-(o-methoxycarbonylanilino)-6-diethylaminofluoran,
2-acetylamino-6-(N-methyl-p-toluidino)fluoran,
3-diethylamino-6-(m-trifluoromethylanilino)fluoran,
4-methoxy-6-(N-ethyl-p-toluidino)fluoran,
2-ethoxyethylamino-3-chloro-6-dibutylaminofluoran,
2-dibenzylamino-4-chloro-6-(N-ethyl-p-toluidino)fluoran,
2-(α-phenylethylamino)-4-chloro-6-diethylaminofluoran,
2-(N-benzyl-p-trifluoromethylanilino)-4-chloro-6-diethylaminofluoran,
2-anilino-3-methyl-6-pyrrolidinofluoran,
2-anilino-3-chloro-6-pyrrolidinofluoran,
2-anilino-3-methyl-6-(N-ethyl-N-tetrahydrofurfuryl-amino) fluoran,
2-mesidino-4',5'-benzo-6-diethylaminofluoran,
2-(m-trifluoromethylanilino)-3-methyl-6-pyrrolidinofluoran,
2-(α-naphthylamino)-3,4-benzo-4'-bromo-6-(N-benzyl-N-cyclohexylamino)fluoran,
2-piperidino-6-diethylaminofluoran,
2-(N-n-propyl-p-trichloromethylanilino)-6-morpholino-fluoran,
2-(di-N-p-chlorophenyl-methylamino)-6-pyrrolidinofluoran,
2-(N-n-propyl-m-trifluoromethylanilino)-6-morpholino-fluoran,
1,2-benzo-6-(N-ethyl-N-n-octylamino)fluoran,
1,2-benzo-6-diallylaminofluoran,
1,2-benzo-6-(N-ethoxyethyl-N-ethylamino)fluoran, benzo leuco methylene blue,
2-[3,6-bis(diethylamino)]-6-(o-chloroanilino)xanthyl-benzoic acid lactam,
2-[3,6-bis(diethylamino)]-9-(o-chloroanilino)xanthyl-benzoic acid lactam,
3,3-bis(p-dimethylaminophenyl)-phthalide,
3,3-bis(p-dimethylaminophenyl)-6-dimethylaminophthalide (or Crystal Violet Lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide,
3-(2-methoxy-4-dimethylaminophenyl)-3-(2-hydroxy-4,5-dichlorophenyl)phthalide,
3-(2-hydroxy-4-dimethylaminophenyl)-3-(2-methoxy-5-chlorophenyl)phthalide,
3-(2-hydroxy-4-dimethoxyaminophenyl)-3-(2-methoxy-5-chlorophenyl)phthalide,
3-(2-hydroxy-4-dimethylaminophenyl)-3-(2-methoxy-5-nitrophenyl)phthalide,
3-(2-hydroxy-4-diethylaminophenyl)-3-(2-methoxy-5-methylphenyl)phthalide,
3-(2-methoxy-4-dimethylaminophenyl)-3-(2-hydroxy-4-chloro-5-methoxyphenyl)phthalide,
3,6-bis(dimethylamino)fluorenespiro (9,3')-6'-dimethylaminophthalide,
3-(1-ethyl-2-methylindole-3-yl)-3-(2-ethoxy-4-diethylaminophenyl)-4-azaphthalide,
3-(1-octyl-2-methylindole-3-yl)-3-(2-ethoxy-4-diethylaminophenyl)-4-azaphthalide,
3-(1-ethyl-2-methylindole-3-yl)-3-(2-ethoxy-4-diethylaminophenyl)-7-azaphthalide,
3,3-bis(2-ethoxy-4-diethylaminophenyl)-4-azaphthalide,
3,3-bis(2-ethoxy-4-diethylaminophenyl)-7-azaphthalide,
6'-chloro-8'-methoxy-benzoindolino-spiropyran, and
6'-bromo-2'-methoxy-benzoindolino-spiropyran.

The reversible thermosensitive coloring composition of the present invention can reversibly assume a color-developed state and a decolorized state by controlling the temperature of the coloring composition in the heating step and/or controlling the cooling rate in the cooling step after the heating step. The color development and decolorization phenomenon of the reversible thermosensitive coloring composition according to the present invention will now be explained with reference to FIG. 1.

In FIG. 1, the abscissa axis of the graph indicates the temperature of a reversible thermosensitive coloring composition, and the ordinate axis indicates the color-developed density of the reversible thermosensitive coloring composition. As is apparent from the graph, the color-developed density of the reversible thermosensitive coloring composition according to the present invention changes depending on the temperature thereof.

In FIG. 1, reference symbol A shows the decolorized state of the reversible thermosensitive coloring composition at room temperature. When the temperature of the coloring composition in the decolorized state A is raised and reaches a temperature $T_1$, the color development takes place because the coloring composition begins to fuse at the temperature $T_1$. Thus, reference symbol B shows the color-developed state of the composition which is in a fused condition.

Even when the temperature of the fused composition in the color-developed state B is rapidly decreased to room temperature, the color-developed state is maintained as the color-developed state C, passing along the route indicated by the solid line between B and C. Reference symbol C shows the color-developed state of the composition in a solid form at room temperature. It depends on the descending rate of temperature in the cooling step whether the color-developed state of the coloring composition can be maintained at room temperature or not. If the fused coloring composition in the color-developed state B is gradually cooled, decolorization takes place while the temperature is descending, passing along the route indicated by the dotted line between B and E. As a result, the coloring composition returns to the initial decolorized state A, or the color-developed density of the composition becomes lower than that of the composition in the color-developed state C.

When the composition in the color-developed state C, which is obtained from the color-developed state B by rapid cooling, is heated again, decolorization takes place at a temperature $T_2$, that is lower than the color development temperature $T_1$, and the color-developed density of the composition is decreased, passing along the route indicated by the broken line between D and E. Thereafter, by decreasing the temperature of the composition, the composition is returned to the initial decolorized state A. The color development temperature and the decolorization temperature vary depending on the color developer and coloring agent employed for the reversible thermosensitive coloring composition, so that the color developer and the coloring agent may be selected according to the application of the reversible thermosensitive coloring composition. In addition, the color-developed density of the composition in the color-developed state B is not always the same as that of the composition in the color-developed state C.

In the color-developed state C of the reversible thermosensitive coloring composition, which is obtained at room temperature by rapidly cooling the fused composition in the color-developed state B, the color developer and the coloring agent are mixed to such a degree that the molecules of the color developer and the coloring agent are in contact with each other to induce the coloring reaction. In such a color-developed state C, the color developer and the coloring agent form an aggregation structure on a molecular level to maintain the color development phenomenon. It is considered that the color-developed state can be maintained in a stable condition at room temperature owing to the formation of the above-mentioned aggregation structure.

On the other hand, the molecules of the color developer and those of the coloring agent cause the phase separation in the decolorized state. In such a decolorized state, the molecules of at least one component, the color developer or the coloring agent, are gathered to form a domain or crystallize out. The molecules of the coloring agent can be separated from those of the color developer by the formation of a domain or crystallization, so that the decolorized state can be stabilized. According to the present invention, in many cases, the completely decolorized state can be obtained by the phase separation of the color developer from the coloring agent, and the crystallization of the color developer.

As shown in FIG. 1, the decolorization takes place when the fused composition in the color-developed state B is gradually cooled, or when the solid composition in the color-developed state C is heated to the temperature $T_2$. In both cases, the aggregation structure of the molecules of the color developer and the coloring agent is broken, and at the same time, the phase separation is induced and the color developer crystallizes out in the composition at the decolorization temperature.

When the reversible thermosensitive coloring composition of the present invention is applied to the reversible thermosensitive recording medium, a colored recording image can be formed in the recording medium in such a manner that the recording medium is heated to fuse the coloring composition, for example, by using a thermal head, and then rapidly cooled. To erase the colored recording image, the recording medium is once heated and thereafter gradually cooled. Alternatively, the recording medium in the color-developed state is heated to a temperature ($T_2$) which is lower than the color development temperature ($T_1$). The above-mentioned two methods for erasing the colored recording image are the same in the sense that the recording medium is temporarily maintained at a temperature where the molecules of the color developer and those of the coloring agent cause phase separation or at least one of the color developer or the coloring agent is caused to crystallize. In the color development process, the recording medium is once heated to the color development temperature, and then rapidly cooled. Such a rapid cooling step is necessary to prevent the reversible thermosensitive recording medium from being retained at the temperature of phase separation or crystallization.

To achieve the rapid or gradual cooling operation in the color development and decolorization process, the temperature-descending rate may be relatively determined according to the combination of the color developer and the coloring agent for use in the reversible thermosensitive coloring composition.

The ratio by the coloring agent to the color developer for use in the composition varies depending on the combination of the employed compounds. It is preferable that the ratio of the color developer to the coloring agent be in the range of (0.1:1) to (20:1), more preferably in the range of (0.2:1) to (10:1), in terms of the molar ratio. When the molar ratio of the color developer to the coloring agent is within the above-mentioned range, the color-developed density of a colored recording image is sufficient for practical use.

The reversible thermosensitive recording medium according to the present invention comprises a support, and a thermosensitive recording layer formed thereon comprising the previously mentioned reversible thermosensitive coloring composition as the main component.

Any material can be used for the support of the reversible thermosensitive recording medium so long as it can support the recording layer thereon. For example, a sheet of paper, a resin film, a synthetic paper, a metallic foil, a glass plate, and a composite member of the above-mentioned materials can be employed.

The thermosensitive recording layer of the reversible thermosensitive recording medium can be in any form as long as the above discussed reversible thermo-sensitive coloring composition is contained therein. In general, the recording layer comprises a binder resin in which the coloring agent and the color developer are finely and uniformly dispersed. Finely-divided particles of the coloring agent and those of the color developer may be independently present in the recording layer, but it is preferable that finely-divided particles of a composite material of the coloring agent and the color developer be dispersed in the recording layer. To obtain such dispersed condition of the finely-divided particles of the composite material, the color developer and the coloring agent may be fused or dissolved in a solvent prior to the coating.

To provide the thermosensitive recording layer on the support, a coating liquid is prepared by separately dispersing or dissolving the coloring agent and the color developer in the respective solvents, and mixing the two liquids, or dispersing or dissolving a mixture of the coloring agent and the color developer in a proper solvent. The coating liquid thus prepared may be coated on the support and dried. Moreover, micro-capsuled color developer and coloring agent can be employed.

For the formation of the reversible thermosensitive recording medium of the present invention, a variety of additives, for instance, a dispersant, a surfactant, an electroconductivity imparting agent, a filler, a lubricant, an antioxidant, a photostabilizer, an ultraviolet light absorber, a coloring stabilizer, and a decolorization accelerating agent may be employed, when necessary, for improving and controlling the coating characteristics and the color development and decolorization properties.

Examples of the binder resin for use in the recording layer are polyvinyl chloride, polyvinyl acetate, vinyl chloride-vinyl acetate copolymer, ethyl cellulose, polystyrene, styrene copolymers, phenoxy resin, polyester, aromatic polyester, polyurethane, polycarbonate, polyacrylic acid ester, polymethacrylic acid ester, acrylic acid copolymers, maleic acid copolymers, polyvinyl alcohol, modified polyvinyl alcohol, hydroxyethyl cellulose, carboxymethyl cellulose and starches. Those binder resins serve to retain the composition of the coloring agent and the color developer in a uniformly dispersed condition in the recording layer without partial aggregation even when the color development and the decolorization are repeated by the application of heat to the recording medium. Therefore, the binder resin with high heat resistance is preferably employed. The binder resin for use in the recording layer may be crosslinked by the application of heat, ultraviolet light or electron radiation.

The reversible thermosensitive recording medium of the present invention may further comprise a protective layer, an adhesive layer, an intermediate layer, an undercoat layer and a backcoat layer to improve the properties of the recording medium.

When the color development and the decolorization are carried out by using the thermal head, it is preferable that a protective layer be provided on the recording layer in order to prevent the deformation of the recording layer and the occurrence of a scar on the surface of the recording layer by the application of heat and pressure thereto.

Examples of the material for use in the protective layer are polyvinyl alcohol, styrene-maleic anhydride copolymer, carboxyl-modified polyethylene, melamine-formaldehyde resin, and urea-formaldehyde resin. Further, an ultraviolet-curing resin and an electron radiation curing resin can also be employed. In addition, the protective layer may comprise an additive such as an ultraviolet light absorber.

Furthermore, it is also preferable to provide an intermediate layer between the recording layer and the protective layer for the purpose of improving the adhesion of the protective layer to the recording layer, preventing the change in characteristics of the recording layer caused by the application of a coating liquid for the protective layer to the recording layer, and preventing the additives for use in the protective layer from moving to the recording layer. A resin with low oxygen permeability is preferably employed for the formation of the protective layer and the intermediate layer because oxidation of the coloring agent and the color developer in the recording layer can be minimized.

The heat-insulating undercoat layer may be provided between the support and the recording layer to effectively utilize the thermal energy applied to the recording medium. Such a heat-insulating undercoat layer can be formed by coating organic or inorganic minute void particles dispersed in a binder resin on the support. There may also be provided an undercoat layer serving to improve the adhesion between the recording layer and the support and prevent the constituent components for use in the recording layer from penetrating into the support.

The same binder resins as employed in the recording layer can be used for the formation of the previously mentioned intermediate layer and undercoat layer.

Each of the protective layer, intermediate layer, recording layer and undercoat layer may further comprise a filler such as calcium carbonate, magnesium carbonate, titanium oxide, silicon oxide, aluminum hydroxide, kaolin, and talc. In addition to the filler, a lubricant, a surfactant and a dispersant may be contained.

To obtain a colored recording image in the reversible thermosensitive recording medium of the present invention, the recording medium may be once heated to a temperature higher than the color development temperature, and thereafter rapidly cooled. To achieve the above-mentioned heating and cooling operations, the recording layer of the recording medium may be heated imagewise for a short period of time using a thermal head or by the application of laser beam thereto. In such a case, the recording layer is just partially heated, and the heat diffusion takes place immediately after the completion of heating step. Therefore, the recording medium can be rapidly cooled. Thus, a color-developed state can be maintained in a stable condition.

To erase the colored recording image formed in the reversible thermosensitive recording medium, the recording medium may be heated for a relatively long period of time, followed by gradual cooling. When the recording medium is heated for a relatively long period of time, the temperature of the recording medium is necessarily increased in a large area. Therefore, the temperature-descending rate becomes relatively slow in the cooling step, so that the decolorization takes place in the process of gradual cooling. In this case, a heat roller, heat stamp, or heated air may be used as the heating means, or the recording medium may be heated for a long period of time by use of the thermal head.

Alternatively, the colored recording image can be erased from the recording medium by temporarily heating the recording medium to a specific temperature lower than the color development temperature. In this case, the thermal energy applied to the recording medium by the thermal head may be lowered by controlling the applied voltage and pulse width as compared with the applied thermal energy in the color development operation. According to this method, the recording and erasing operations can be achieved by use of the identical thermal head. As a matter of course, the heat roller and the heat stamp can also be employed in such a case.

Other features of this invention will become apparent in the course of the following description of exemplary embodiments which are given for illustration of the invention and are not intended to be limiting thereof.

Synthesis Example 1

Synthesis of 4-(11-hydroxyundecylmercapto)phenol 1.45 g of 85% potassium hydroxide was dissolved in 100 ml of ethanol at room temperature. 2.78 g of 4-mercaptophenol was then added to the above-prepared solution, and dissolved therein. To the above prepared reaction mixture, 5.0 g of 11-bromo-1-undecanol was added, and the reaction mixture was allowed to react for 3 hours under the condition that the ethanol was refluxed. The thus obtained reaction mixture was cooled to room temperature, and concentrated by use of a rotary evaporator. The concentrated reaction mixture was poured into 500 ml of water, followed by vigorous stirring. Thus, a white solid separated out. The resultant white solid was recrystallized from a mixed solvent of ethyl acetate and hexane, so that 4.5 g of 4-(11-hydroxyundecylmercapto) phenol was obtained.

The melting point of the above-mentioned compound was 99.60° C.

The results of the elemental analysis of the thus obtained phenol compound were as follows:

| | % C | % H | % S |
|---|---|---|---|
| Found | 68.32 | 9.49 | 10.98 |
| Calculated | 68.87 | 9.52 | 10.81 |

Figure 2:
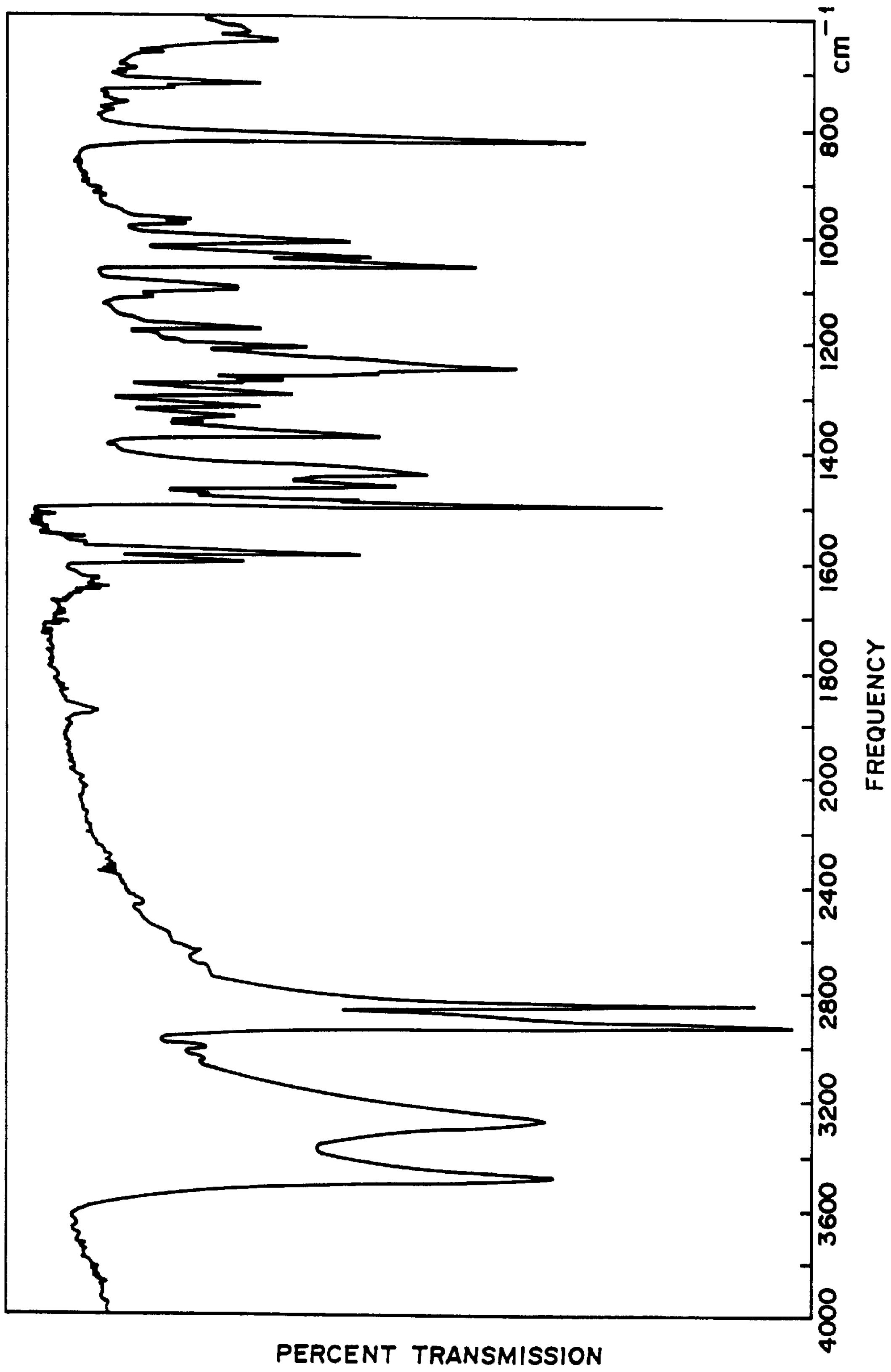
FIG. 2 is an infrared spectrum of a color developer compound synthesized in Synthesis Example 1 for use in a reversible thermosensitive coloring composition according to the present invention.

An infrared spectrum of the above synthesized 4-(11-hydroxyundecylmercapto) phenol is shown in FIG. 2.

Synthesis Example 2

Synthesis of 4-(10-carboxydecylmercapto)phenol 2.89 g of 85% potassium hydroxide was dissolved in 150 ml of ethanol at room temperature. 5.30 g of 4-mercaptophenol was then added to the above-prepared solution, and dissolved therein. To the above prepared reaction mixture, 10.0 g of 10-bromo-1-undecanoic acid was added, and the reaction mixture was allowed to react for 3 hours under the condition that the ethanol was refluxed. The thus obtained reaction mixture was cooled to room temperature, and concentrated by use of a rotary evaporator. The concentrated reaction mixture was poured into 500 ml of water, followed by vigorous stirring. Thus, a white solid separated out. The resultant white solid was recrystallized from a mixed solvent of ethyl acetate and hexane, so that 9.5 g of 4-(10-carboxydecylmercapto) phenol was obtained.

The melting point of the above-mentioned compound was 123.6° C.

The results of the elemental analysis of the thus obtained phenol compound were as follows:

| | % C | % H | % S |
|---|---|---|---|
| Found | 65.61 | 8.38 | 10.28 |
| Calculated | 65.77 | 8.44 | 10.33 |

Figure 3:
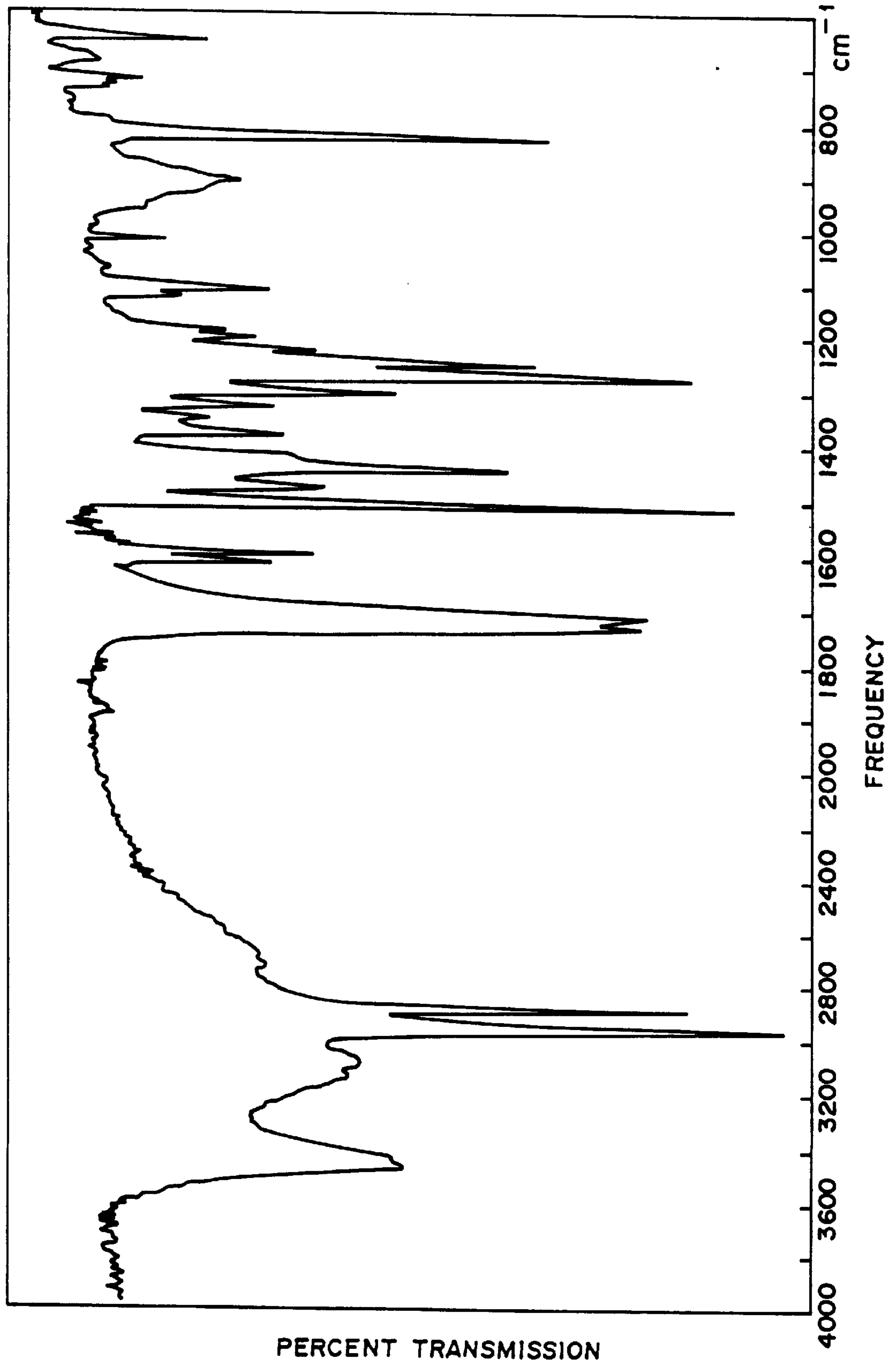
FIG. 3 is an infrared spectrum of a color developer compound synthesized in Synthesis Example 2 for use in a reversible thermosensitive coloring composition according to the present invention.

An infrared spectrum of the above synthesized 4-(10-carboxydecylmercapto) phenol is shown in FIG. 3.

EXAMPLE 1

The amounts of 2-(o-chloroanilino)-6-dibutylamino-fluoran serving as a coloring agent and 4-(11-hydroxyundecylmercapto)phenol synthesized in Synthesis Example 1 serving as a color developer were weighed so as to have a molar ratio of the coloring agent to the color developer of 1:5. The mixture of the above-mentioned compounds was ground in a mortar.

A glass plate with a thickness of 1.2 mm was heated to 170° C. on a hot plate. A small amount of the above obtained mixture of the color developer and the coloring agent was put on the heated glass plate to fuse the mixture. The mixture assumed a black color the moment it was fused. Thereafter, a glass cover was overlaid on the fused mixture to spread the fused mixture to have a uniform thickness. Immediately after that, the fused mixture interposed between the glass plate and the glass cover was caused to sink in iced water in its entirety to rapidly cool the fused mixture, and then it was taken out of the iced water when the temperature of the mixture was decreased. By wiping water from the glass plates, a reversible thermosensitive coloring composition in the form of a thin film according to the present invention was obtained in a color-developed state.

Next, the above obtained reversible thermosensitive coloring composition in the color-developed state was placed on a hot plate of 85° C. As a result, the black color instantaneously disappeared. The decolorization temperature was considered to be 85° C.

Then, the coloring composition in the decolorized state was again heated to 170° C., followed by rapid cooling in iced water, so that the composition assumed a black color again. Thus, it was confirmed that the reversible thermosensitive coloring composition has repetition properties of the color development and the decolorization.

EXAMPLE 2

The procedure for preparation of the reversible thermosensitive coloring composition as employed in Example 1 was repeated except that 4-(11-hydroxyundecylmercapto) phenol serving as the color developer in Example 1 was replaced by 4-(10-carboxydecylmercapto)phenol synthesized in Synthesis Example 2, so that a reversible thermosensitive coloring composition according to the present invention was obtained in a color-developed state.

Using the above-mentioned composition, decolorization and color development were repeated in the same manner as in Example 1 except that the decolorization temperature was changed to 90° C. As a result, the repetition properties of color development and decolorization were confirmed.

EXAMPLE 3

The following components were dispersed and ground in a ball mill until the particle size reached 1 to 4 μm, so that a coating liquid for a thermosensitive recording layer was prepared:

| | Parts by Weight |
|---|---|
| 2-(o-chloroanilino)-6-N-dibutylaminofluoran | 2 |
| 4-(11-hydroxyundecylmercapto)-phenol | 8 |
| Vinyl chloride-vinyl acetate copolymer (Trademark "VYHH" made by Union Carbide Japan K.K.) | 20 |
| Methyl ethyl ketone | 45 |
| Toluene | 45 |

The thus prepared coating liquid for the recording layer was coated on a polyester film with a thickness of 100 μm by wire bar, and dried, so that a thermosensitive recording layer with a thickness of about 6.0 μm was provided on the polyester film. Thus, a reversible thermosensitive recording medium according to the present invention was fabricated.

EXAMPLE 4

The procedure for fabrication of the reversible thermosensitive recording medium in Example 3 was repeated except that the formulation for the coating liquid of the thermosensitive recording layer employed in Example 3 was changed to the following formulation:

| | Parts by Weight |
|---|---|
| 2-anilino-3-methyl-6-(N-ethyl-N-p-tolylamino)fluoran | 2 |
| 4-(10-carboxydecylmercapto)-phenol | 8 |
| Vinyl chloride-vinyl acetate copolymer (Trademark "VYHH" made by Union Carbide Japan K.K.) | 20 |
| Methyl ethyl ketone | 45 |
| Toluene | 45 |

Thus, a reversible thermosensitive recording medium of the present invention was fabricated.

Comparative Example 1

The procedure for fabrication of the reversible thermosensitive recording medium in Example 3 was repeated except that the formulation for the coating liquid of the thermosensitive recording layer employed in Example 3 was changed to the following formulation:

| | Parts by Weight |
|---|---|
| 2-anilino-3-methyl-6-(N-ethyl-N-p-tolylamino)fluoran | 2 |
| 4-undecylmercaptophenol | 8 |
| Vinyl chloride-vinyl acetate copolymer (Trademark "VYHH" made by Union Carbide Japan K.K.) | 20 |
| Methyl ethyl ketone | 45 |
| Toluene | 45 |

Thus, a comparative reversible thermosensitive recording medium was fabricated.

Each of the reversible thermosensitive recording media according to the present invention fabricated in Examples 3 and 4 and the comparative reversible thermo-sensitive recording medium fabricated in Comparative Example 1 was subjected to a color development and decolorization test. First, color development was caused to induce in each recording medium with the application of thermal energy thereto by using a thermal head of 8 dots/mm under the conditions that the applied voltage was 13.3 V and the applied pulse width was 1.2 mm/sec, whereby a colored image was formed in each reversible thermosensitive recording medium.

The color-developed density of the colored image thus formed in the recording medium was measured by a Mcbeth densitometer RD-914. The results are shown in Table 2.

Then, the colored image formed in each recording medium was erased therefrom in such a manner that the recording medium was placed in a constant temperature bath which was controlled to the decolorization temperature as shown in Table 2 for about one minute. The decolorized density of each recording medium was measured similarly.

Such a color development and decolorization test was repeated 10 times, and the color-developed density of the colored image and the decolorized density were measured in the 10th color development and decolorization test. The results are shown in Table 2.

TABLE 2

| | Decolorization Temperature (° C.) | 1st Color Development and Decolorization Test: Color-developed Density | 1st Color Development and Decolorization Test: Decolorized Density | 10th Color Development and Decolorization Test: Color-developed Density | 10th Color Development and Decolorization Test: Decolorized Density |
|---|---|---|---|---|---|
| Ex. 3 | 85 | 1.30 | 0.14 | 1.28 | 0.14 |
| Ex. 4 | 85 | 1.26 | 0.16 | 1.25 | 0.16 |
| Comp. Ex. 1 | 80 | 1.12 | 0.18 | 1.09 | 0.20 |

Furthermore, the preservation stability of the colored image was evaluated in such a manner that each recording medium in a color-developed state was stored at 40° C. and 30% RH or less for 24 hours. As a result, the color-developed densities of the reversible thermo-sensitive recording media fabricated in Examples 3 and 4 were scarcely decreased, while the decrease of the color-developed density of the comparative thermosensitive recording medium fabricated in Comparative Example 1 was considerable.

As previously explained, the reversible thermosensitive coloring composition of the present invention is capable of reversibly assuming a color-developed state and a decolorized state in a stable condition many times. Therefore, when the reversible thermosensitive recording medium is fabricated using the above-mentioned reversible thermosensitive coloring composition, a colored image can be formed therein with high image contrast, and the colored image can be erased therefrom very easily. In addition, the preservation stability of the colored image is excellent, so that the reversible thermosensitive recording medium of the present invention becomes remarkably useful.

Japanese Patent Application No. 7-245165 filed on Aug. 31, 1995, Japanese Patent Application No. 7-245182 filed on Aug. 31, 1995, and Japanese Patent Application filed on Aug. 20, 1996 are hereby incorporated by reference.

What is claimed is:

1. A reversible thermosensitive coloring composition comprising an electron-donating coloring compound and an electron-accepting compound which is capable of inducing color formation in said electron-donating coloring compound, capable of reversibly assuming a color-developed state or a decolorized state, depending upon the the temperature of said reversible thermosensitive coloring composition when heated, and/or the cooling rate of said reversible thermosensitive coloring composition when cooled after the heating thereof, wherein said electron-accepting compound is a compound of formula (I):

$$A—R—X \quad (I)$$

wherein A represents a color-developing moiety capable of inducing color formation in said electron-donating coloring compound; R represents an aliphatic hydrocarbon group comprising as the main chain thereof a straight chain hydrocarbon group having 8 or more carbon atoms, and may comprise a bivalent hetero-atom containing group and/or a bivalent aromatic group; and X represents a hetero-atom containing associative group.

2. The reversible thermosensitive coloring composition as claimed in claim 1, wherein said color-developing moiety represented by A is a moiety of formula (II):

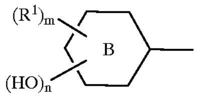
(II)
wherein B is a ring selected from the group consisting of an aromatic ring and a heterocyclic ring; $R^1$ is an alkyl group having 1 to 6 carbon atoms, an alkoxyl group having 1 to 6 carbon atoms, or a halogen atom; n is an integer of 1 to 3; and m is an integer of 0 to 3.
* * * * *